United States Patent
Chashchukhin

(10) Patent No.: US 9,499,035 B1
(45) Date of Patent: Nov. 22, 2016

(54) VEHICLE COVER

(71) Applicant: Sergey Chashchukhin, New Bedford, MA (US)

(72) Inventor: Sergey Chashchukhin, New Bedford, MA (US)

( * ) Notice: Subject to any disclaimer, the term of this patent is extended or adjusted under 35 U.S.C. 154(b) by 0 days.

(21) Appl. No.: 14/854,185

(22) Filed: Sep. 15, 2015

(51) Int. Cl.
*B60J 11/04* (2006.01)

(52) U.S. Cl.
CPC .................... *B60J 11/04* (2013.01)

(58) Field of Classification Search
CPC .................... B60J 11/04; B60J 11/08
USPC ......... 150/166, 168; 196/136.02; 296/136.08
See application file for complete search history.

(56) References Cited

U.S. PATENT DOCUMENTS

| D25,879 | S | | 8/1896 | Oonstantin | |
|---|---|---|---|---|---|
| 3,474,803 | A | * | 10/1969 | Davis | E04H 6/04 135/124 |
| 3,517,141 | A | * | 6/1970 | Gaines | H01H 21/285 200/16 A |
| 4,114,668 | A | * | 9/1978 | Hickey | B65D 19/44 206/386 |
| 4,261,401 | A | * | 4/1981 | Hickey | B65D 19/44 150/166 |
| 4,319,781 | A | * | 3/1982 | Tsuge | B62J 1/18 150/167 |
| D297,306 | S | | 8/1988 | King | |
| 4,941,310 | A | | 7/1990 | Kristen | |
| 5,193,724 | A | | 3/1993 | Robbins | |
| 5,343,915 | A | * | 9/1994 | Newsome | B60R 25/00 150/166 |
| 5,664,825 | A | * | 9/1997 | Henke | B60J 11/00 150/166 |
| 5,954,200 | A | * | 9/1999 | Allain | B60J 11/00 206/335 |
| 6,402,862 | B1 | * | 6/2002 | Anderton | B62D 55/21 148/570 |
| 8,069,987 | B2 | | 12/2011 | Choy | |
| 8,991,063 | B2 | * | 3/2015 | Eckhart | F41J 3/0004 273/407 |
| 2005/0247387 | A1 | | 11/2005 | Hooker | |
| 2006/0151354 | A1 | | 7/2006 | Dombroski | |
| 2006/0225822 | A1 | * | 10/2006 | Chen | B60J 11/00 150/166 |
| 2010/0147425 | A1 | * | 6/2010 | Swain | B65D 31/02 150/166 |
| 2014/0150706 | A1 | | 6/2014 | Kent | |

FOREIGN PATENT DOCUMENTS

EP 2196405 6/2010

* cited by examiner

*Primary Examiner* — Sue A Weaver
(74) *Attorney, Agent, or Firm* — Kyle A. Fletcher, Esq.

(57) ABSTRACT

The vehicle cover is a vacuum-sealed shelter that is used to enclose automobiles, boats or other light vehicles such as motorcycles and all-terrain vehicles. Specifically, the vehicle cover forms an airtight and water-tight sheath around the vehicle. A vacuum pump is then used to remove air contained within the airtight and water tight sheath thereby reducing the overall displacement of the protected vehicle and airtight and water tight sheath. The vehicle cover also provides a plurality of grommets that can be used to secure the vehicle in a safe location. The vehicle cover comprises a heavy-duty bag and a vacuum pump.

13 Claims, 5 Drawing Sheets

VEHICLE COVER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

The present invention relates to the field of miscellaneous parts and accessories for vehicles and the field of vacuum tie downs, more specifically, a vacuum operated cover configured for use with personal vehicles such as automobiles, boats, motorcycles and recreational vehicles.

Flood and storm water damage to automobiles, boats and other light vehicles powered with internal combustion engines such as motorcycles, and all-terrain vehicles can be catastrophic. The costs to repair the damage caused by the introduction of floodwater and its associated debris into the exhaust system, cylinders of the engine, transmission systems, and electronic systems of these vehicles is invariably greater that the replacement cost of the vehicle. This does not take into account the damage and risk of mold that the introduction of flood water and its associated debris cause to the upholstery, trim and finish to the vehicle.

Given the value of investments in these vehicles and the increasing frequency of government mandated evacuation during storms in flood prone areas, a need clearly exists to protect vehicles in times of storm related emergency.

SUMMARY OF INVENTION

This above need is addressed in the current disclosure.

The vehicle cover is a vacuum-sealed shelter that is used to enclose automobiles, boats or other light vehicles such as motorcycles and all-terrain vehicles. Specifically, the vehicle cover forms an airtight and water-tight sheath around the vehicle. A vacuum pump is then used to remove air contained within the airtight and water tight sheath thereby reducing the overall displacement of the protected vehicle and airtight and water tight sheath. The vehicle cover also provides a plurality of grommets that can be used to secure the vehicle in a safe location.

During a bad weather situation, the automobile, boat or other light vehicle is placed in the vehicle cover, vacuum-sealed and secured in a safe location. In the worst case scenario of a flood: 1) the vehicle cover prevents the elements from reaching and damaging the automobile, boat or other light vehicle; 2) the reduced displacement created by the vacuum seal reduces the probability of the automobile, boat or other light vehicle from floating within the flood waters; and 3), the plurality of grommets hold the automobile, boat or other light vehicle preventing damage from unintended movement of the automobile, boat or other light vehicle.

These together with additional objects, features and advantages of the vehicle cover will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle cover in detail, it is to be understood that the vehicle cover is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle cover.

It is therefore important that the claims be regarded as including such equivalent construction insofar as they do not depart from the spirit and scope of the vehicle cover. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
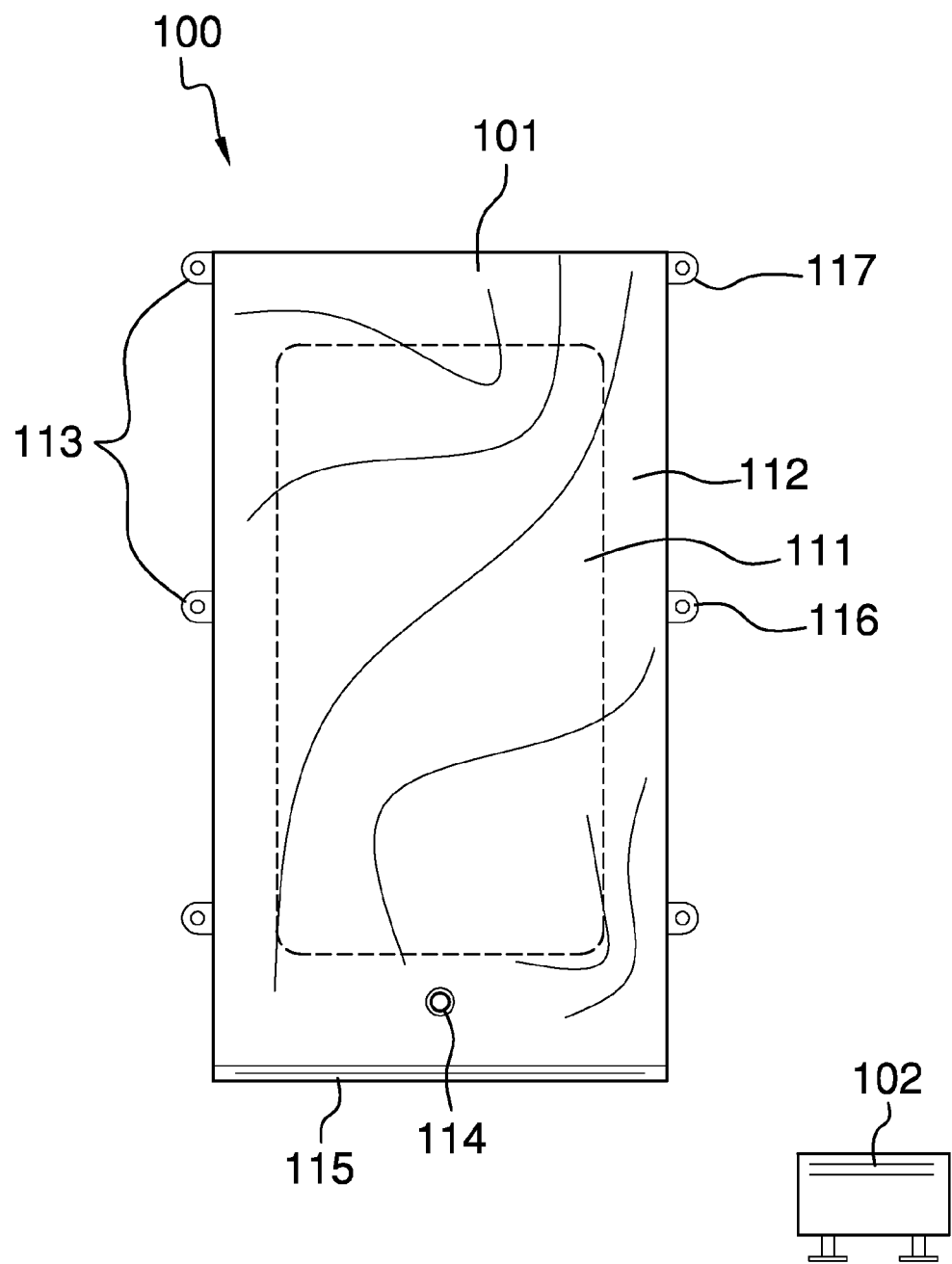
FIG. 1 is a top view of an embodiment of the disclosure.
Figure 2:
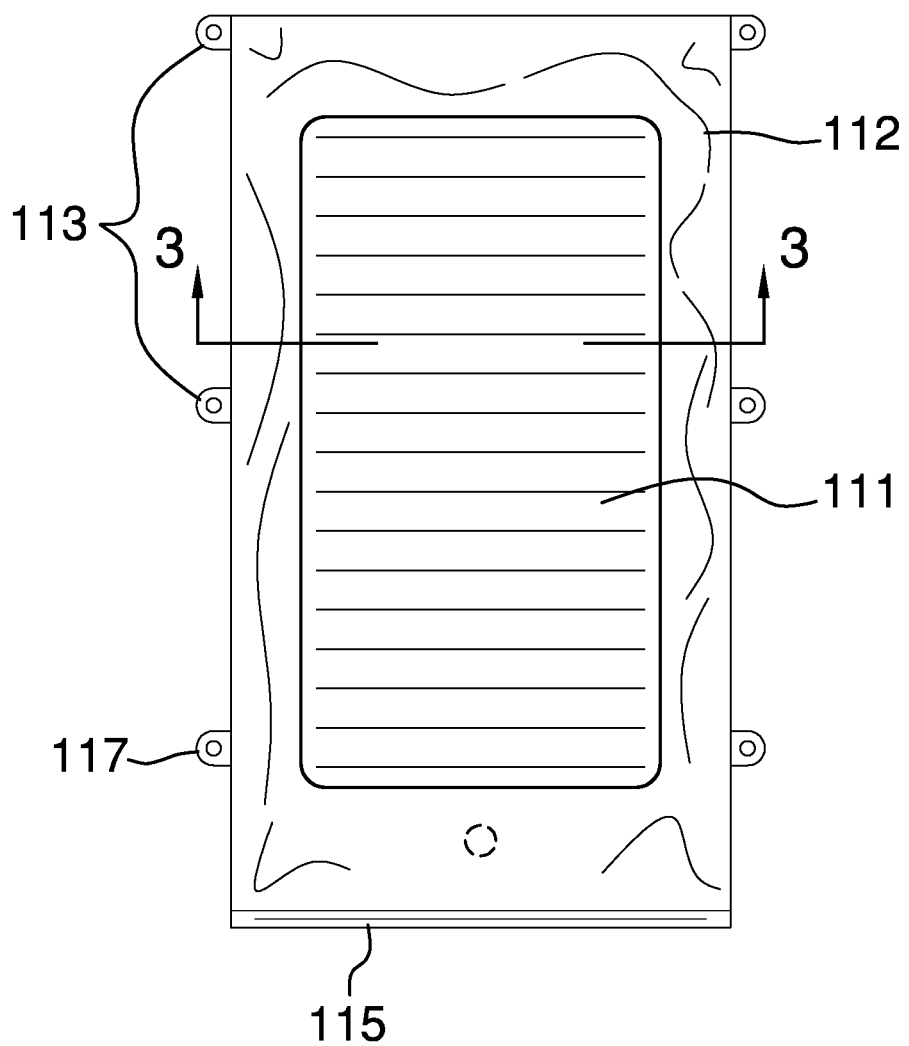
FIG. 2 is a bottom view of an embodiment of the disclosure.
Figure 3:
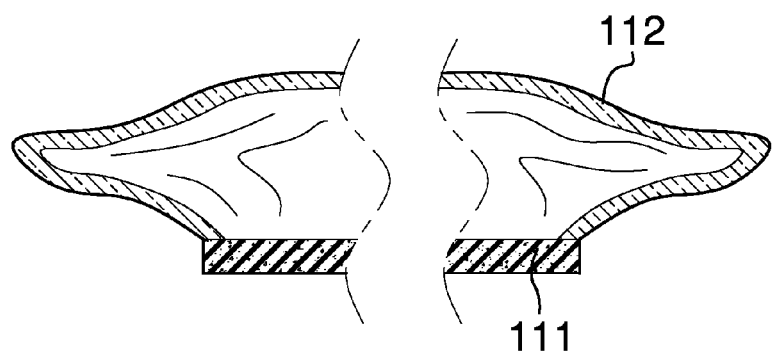
FIG. 3 is a cross-sectional view of an embodiment of the disclosure.
Figure 4:
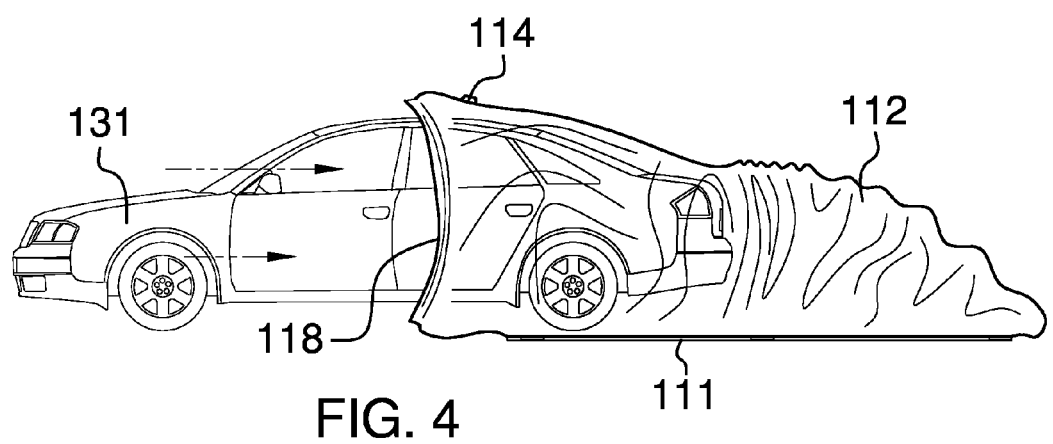
FIG. 4 is a side view of an embodiment of the disclosure.
Figure 5:
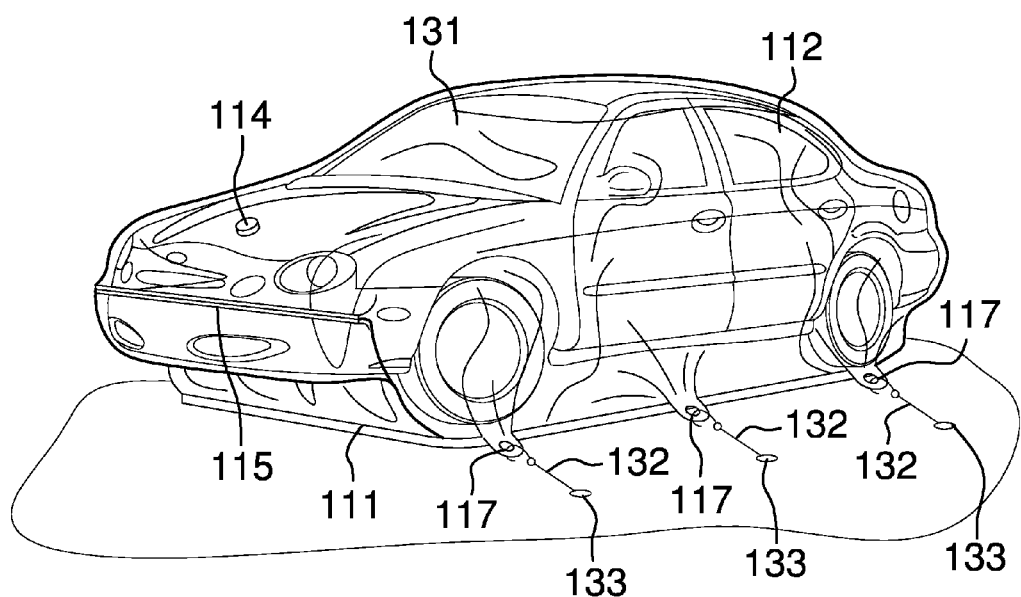
FIG. 5 is an in use view of an embodiment of the disclosure.
Figure 6:
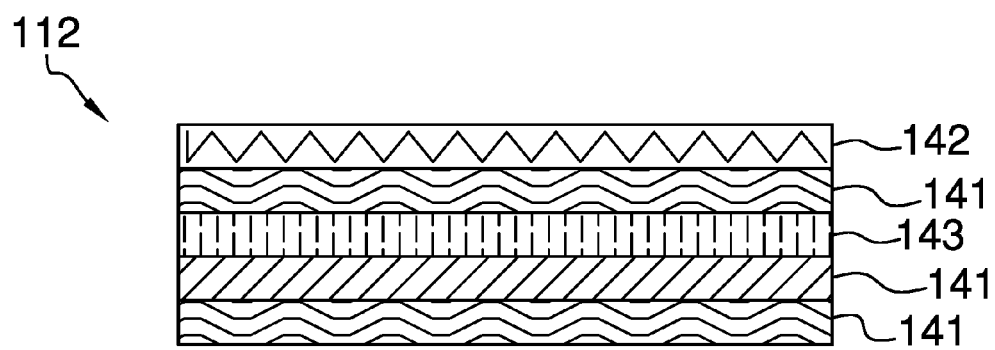
FIG. 6 is a detail view of an embodiment of the disclosure.
Figure 7:
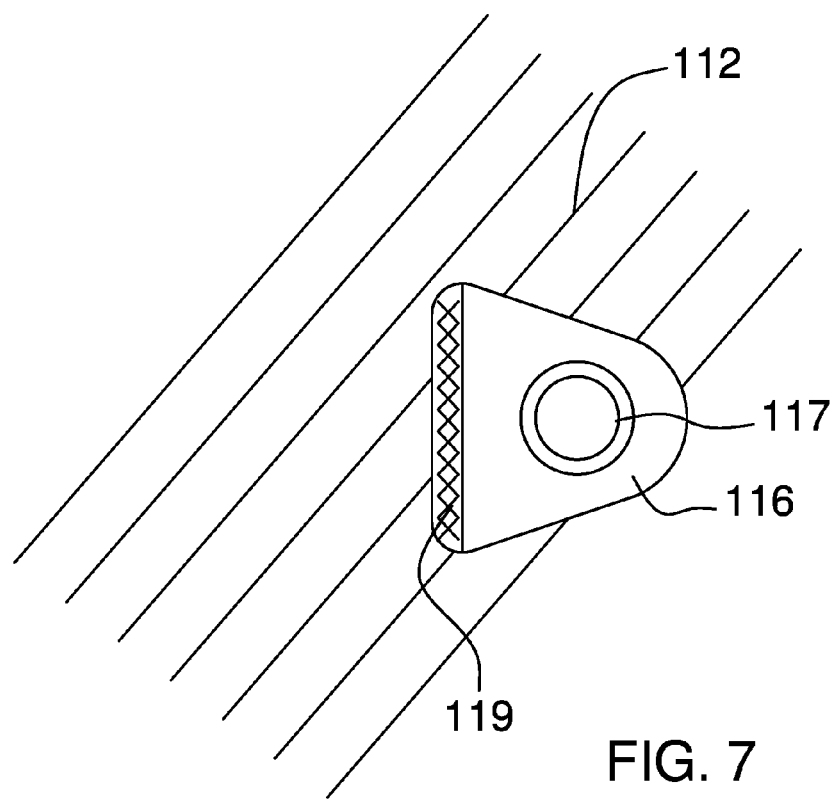
FIG. 7 is a detail view of an embodiment of the disclosure.

Detailed reference will now be made to a first potential embodiment of the disclosure, which is illustrated in FIGS. 1 through 7.

It is explicitly acknowledged that vehicle cover can be used with a broad range of vehicles and objects, including those that do not use internal combustion engines. However, the specification and claims of this disclosure will hereinafter implicitly assume the use of an automobile as the vehicle. This is done for the purposes of simplicity and clarity of exposition of the disclosure is not intended to limit the scope of the appended claims. Those skilled in the art will recognize that the disclosure can be readily modified to accommodate vehicles and objects, including those that do not use internal combustion engines, with a minimum of modification and experimentation.

The vehicle cover 100 (hereinafter invention) comprises a heavy duty bag 101 and a vacuum pump 102.

The vacuum pump 102 is a readily and commercially available vacuum pump. A vacuum pump 102 that is capable of pumping between five to seven cubic feet per minute has the best tradeoff between cost and performance and is preferred. A vacuum pump 102 that is capable of pumping between five to seven cubic feet per minute can be used to seal a typically sized automobile in between 60 and 75 minutes.

The heavy duty bag 101 further comprises a vehicle base 111, a plastic sheath 112, a plurality of grommets 113, a vacuum valve 114 and a vacuum seal device 115.

The plastic sheath 112 is a polymer based sheeting that is formed as a composite sheeting from multiple layers of polyethylene 141 and at least one outer nylon layer 142. Polyethylene layers 141 provide strength and tear resistance to the plastic sheath 112. The outer nylon layer 142, which is exposed to the environment, is impermeable to air and moisture. Optionally, layers of polyethylene can be replaced with layers of para-phenylene terephthalamide 143 based fabric sheeting to further increase the strength of the plastic sheath 112. The composite sheeting is at least 0.075 mm thickness. The preferred thickness of the composite sheeting is 0.25 mm. The plastic sheath 112 is generally formed in the shape of a bag into which the vehicle 131 can be driven.

The vehicle base 111 is a high strength foundation over which the vehicle 131 is transported. The purpose of the vehicle base 111 is to protect the plastic sheath 112 by having the vehicle base 111 absorb the bulk of the friction and other wear and tear of receiving the vehicle 131 into and removing vehicle 131 from the plastic sheath 112. It is preferred that the vehicle base 111 be attached to the interior surface of the plastic sheath 112. Methods to attach the vehicle base 111 to the plastic sheath 112 include, but are not limited to, the use of glue or thermal bonding. Alternatively, the vehicle base 111 can be placed as a separate and unattached component within the plastic sheath 112. The vehicle base 111 can be formed from several materials including, but not limited to, high density polyethylene, poly(methyl methacrylic), polyoxymethylene, or latex.

The size and form of the plastic sheath 112 and the vehicle base 111 of a given embodiment of the disclosure are designed to accommodate the dimensions of a specific vehicle 131. One skilled in the art will immediately recognize that vehicles of similar or small dimensions than the vehicle 131 for which the given embodiment of the disclosure was designed can be accommodated by the invention 100.

Once the vehicle 131 is placed within the plastic sheath 112, the plastic sheath 112 is closed with a vacuum seal device 115. The size of the opening 118 of the plastic sheath 112 and the vacuum seal device 115 is determined through the design of the specific embodiment of the disclosure. Methods to provide form a vacuum seal device 115 in a plastic sheath 112 are well known and documented in the art. In the first potential embodiment of the disclosure, a zip lock seal is used.

The vacuum valve 114 is a commercially available valve that is inserted through the plastic sheath 112. The purpose of the vacuum valve 114 is to allow for the connection of the vacuum pump 102 so that the vacuum can be drawn within the plastic sheath 112. In the first potential embodiment of the disclosure, a commercially available vacuum check valve was used. Methods to install and seal valves through plastic sheath are well known and documented in the art.

The plurality of grommets 113 are used to provide tie down points for use with the invention 100. This allows the invention 100 to be secured to a specific location after the vehicle 131 is place inside the plastic sheath 112 and the vacuum is drawn. Each of the plurality of grommets 113 comprises a polymer flap 116 that is roughly triangular in shape and an individual grommet 117. The polymer flap 116 is formed from plastic sheeting. The individual grommet 117 is mounted within the polymer flap 116. A joined edge 119 of the polymer flap 116 is attached to the plastic sheath 112. Methods to attach the polymer flap 116 to the plastic sheath 112 include, but are not limited to, the use of glue or thermal bonding. Suitable plastics for use as the polymer flap 116 include, but are not limited to, the same composite plastic used to form the plastic sheath 112.

To use the invention 100, the opening 118 of the plastic sheath 112 is held open in such a way that the vehicle 131 may be driven into the plastic sheath 112 such that it rests on the vehicle base 111. The vacuum seal device 115 is then closed. The vacuum pump 102 is attached to the vacuum valve 114 and air is pumped out of the plastic sheath 112. Once the air is pumped out of the plastic sheath 112, the invention 100 is tied down by using rope or wire 132 to secure each of the plurality of grommets 113 to an externally provided anchor point 133. When the time comes to remove the vehicle 131 from the invention 100, the vacuum seal device 115 is opened and air enters the plastic sheath 112. Once the air pressure within the plastic sheath 112 is equalized, the vehicle 131 may be driven out of the plastic sheath 112.

The following definitions were used in this disclosure:

Automobile: As used in this disclosure, an automobile is a road vehicle that is powered by an internal combustion engine. This definition is specifically intended to include vehicles generally referred to as pickup trucks.

Grommet: As used in this disclosure, a grommet is an eyelet placed in a hole in a textile, sheet, or panel that protects a rope hook or cable passed through it and to protect the textile, sheet, or panel from being torn.

Sheeting: As used in this disclosure, sheeting is a material, such as cloth or plastic, in the form of a thin flexible layer or layers that is used to cover something.

Tarpaulin: As used in this disclosure, a tarpaulin is a protective covering made of a sheeting. The sheeting can be a textile material made from made from fibers or yarns suitable for textile production methods including, but not limited to, weaving, knitting or felting. The sheeting can also be made of material in the form of a continuous film including, but not limited to, plastic films.

Vehicle: As used in this disclosure, a vehicle is a device that is used transporting carrying passengers, goods, or equipment.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A vacuum bag comprising:
a heavy duty bag that further comprises a vehicle base, a plastic sheath, a vacuum valve and a vacuum seal device;
wherein the heavy duty bag is used to protect vehicles and boats;
wherein the heavy duty bag is adapted for use with a vacuum pump;
wherein the vehicle may be driven into the heavy duty bag;
wherein the heavy duty bag further comprises a plurality of grommets;
wherein the plurality of grommets are adapted for use with ropes or wires to secure the heavy duty bag to externally provided anchor points;
wherein the plastic sheath is a polymer based sheeting;
wherein the plastic sheath is formed as a first composite sheeting that comprises a plurality of layers of polyethylene and at least one outer nylon layer;
wherein the plastic sheath is generally formed in the shape of a bag;
wherein the vehicle base is a high strength foundation over which the vehicle is transported;
wherein the vehicle base is attached to the interior surface of the plastic sheath;
wherein the plastic sheath is further formed with a vacuum seal device.

2. The vacuum bag according to claim 1 wherein the first composite sheeting further comprises a layer of para-phenylene terephthalamide based fabric sheeting.

3. The vacuum bag according to claim 1 wherein the composite sheeting is at least 0.075 mm in thickness.

4. The vacuum bag according to claim 3 wherein the composite sheeting is at least 0.25 mm in thickness.

5. The vacuum bag according to claim 4 wherein the vehicle base is formed from a material selected from a group of materials consisting of high density polyethylene, poly (methyl methacrylic), polyoxymethylene, or latex.

6. The vacuum bag according to claim 5 wherein the vacuum seal device is a zip lock.

7. The vacuum bag according to claim 5 wherein each of the plurality of grommets comprises a polymer flap that is roughly triangular in shape and an individual grommet.

8. The vacuum bag according to claim 7 wherein the polymer flap is formed from plastic sheeting.

9. The vacuum bag according to claim 8 wherein the individual grommet is mounted within the polymer flap.

10. The vacuum bag according to claim 9 wherein a joined edge of the polymer flap is attached to the plastic sheath.

11. The vacuum bag according to claim 10 wherein the polymer flap is formed as a second composite sheeting that comprises a plurality of layers of polyethylene and at least one outer nylon layer.

12. The vacuum bag according to claim 11 wherein the second composite sheeting further comprises a layer of para-phenylene terephthalamide based fabric sheeting.

13. The vacuum bag according to claim 11 wherein the vacuum bag further comprises a vacuum pump.

* * * * *